United States Patent

[11] 3,607,035

| [72] | Inventor | Edwin K. Jones<br>Kenilworth, Ill. |
|---|---|---|
| [21] | Appl. No. | 801,406 |
| [22] | Filed | Feb. 24, 1969 |
| [45] | Patented | Sept. 21, 1971 |
| [73] | Assignee | Universal Oil Products Company<br>Des Plaines, Ill. |

[54] PROCESS FOR TREATING A SULFURIC ACID-OLEFINIC HYDROCARBON MIXTURE
4 Claims, 1 Drawing Fig.

| [52] | U.S. Cl. | 23/172, 23/173, 252/414 |
|---|---|---|
| [51] | Int. Cl. | C01b 17/90 |
| [50] | Field of Search | 23/172, 173, 252/414 |

[56] References Cited
UNITED STATES PATENTS

| 1,409,590 | 3/1922 | Salathe | 23/173 |
|---|---|---|---|
| 2,343,791 | 3/1944 | O'Dell | 23/172 |
| 2,254,788 | 9/1941 | Ballard | 23/172 |

FOREIGN PATENTS

| 860,370 | 2/1961 | England | 23/173 |
|---|---|---|---|

Primary Examiner—Oscar R. Vertiz
Assistant Examiner—Charles B. Rodman
Attorneys—James R. Hoatson, Jr. and Philip T. Liggett ABSTRACT: A sulfuric acid-olefinic hydrocarbon mixture is treated by contacting the mixture with an aromatic compound, at temperatures below about 72° F. so that the aromatic compound selectively reacts with at least a portion of the olefinic hydrocarbon portion of the mixture.

PATENTED SEP 21 1971  3,607,035
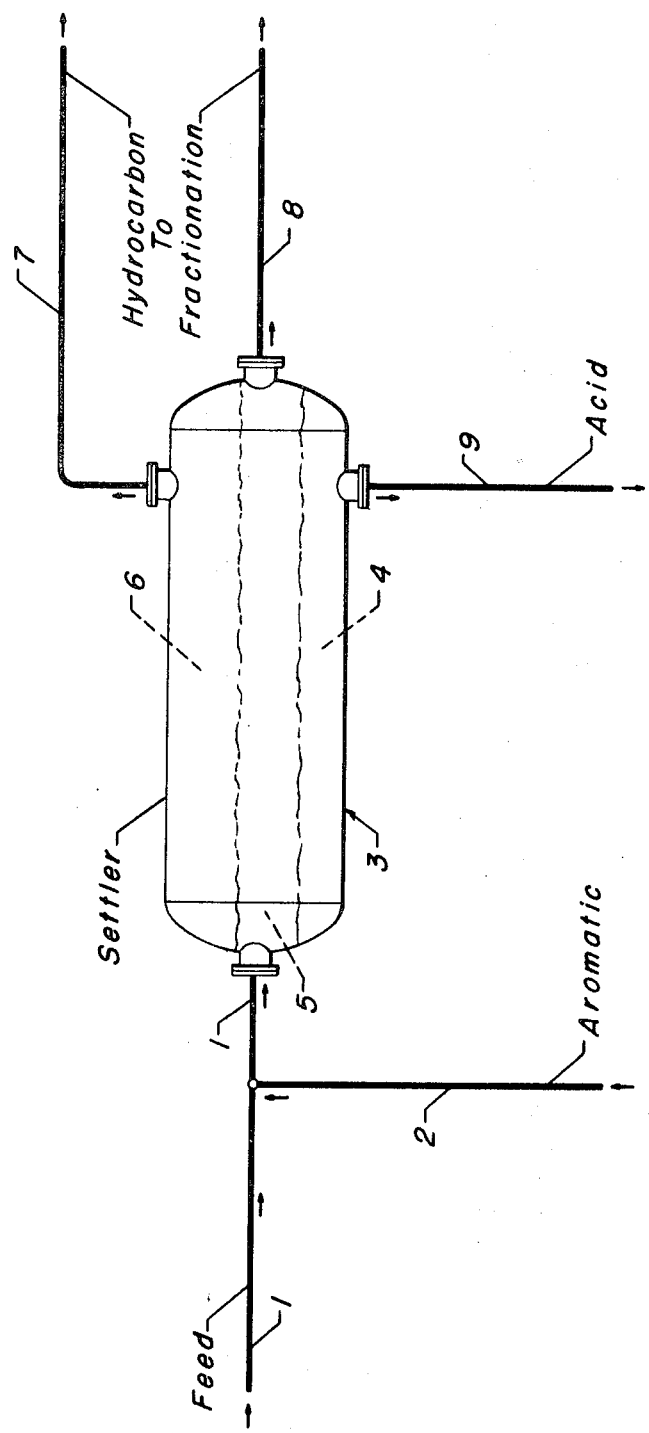
INVENTOR:
Edwin K. Jones
BY James R. Hoatson, Jr.
Philip T. Liggett
ATTORNEYS ic acid-olefinic hydrocarbon mixture. It specifically relates to a continuous in situ process for the regeneration of a sulfuric acid alkylation catalyst.

PROCESS FOR TREATING A SULFURIC ACID-OLEFINIC HYDROCARBON MIXTURE

BACKGROUND OF THE INVENTION

This invention relates to a treating process. It particularly relates to a process for treating sulfuric acid-olefinic hydrocarbon mixture. It specifically relates to a continuous in situ process for the regeneration of a sulfuric acid alkylation catalyst.

It is well known in the prior art that catalytic alkylation utilizing sulfuric acid as the catalyst is an important chemical tool for preparing alkylated hydrocarbons and derivatives thereof. The commercial and industrial demand for these products is exemplified by the demand for isoparaffin hydrocarbons and alkyl substituted benzenes of gasoline boiling range and with the demand for alkyl substituted aromatics suitable for conversion to surfactants, e.g., detergents, wetting agents, and the like.

This invention is especially applicable for the regeneration of a sulfuric acid catalyst from a catalytic alkylation unit. In such processes, there is a need for periodic regeneration of the catalyst system inasmuch as the catalyst becomes spent. This is usually accomplished in prior art schemes by taking a stream of at least a portion of the liquid catalyst and passing it to a regeneration column wherein the catalyst is stripped with a stripping agent at usually high temperatures. A problem with such prior art regeneration schemes is that the regeneration facilities are usually very far from the alkylation unit itself. Further, such prior art processes for regenerating a liquid catalyst usually involve distillation schemes which present problems both from a process standpoint and from an apparatus standpoint inasmuch as the presence of water, for example, will cause, for example, a severe corrosion problem in the regeneration equipment that would normally be utilized in a typical regeneration equipment that would normally be utilized in a typical regeneration scheme.

SUMMARY OF THE INVENTION

Accordingly, it is an object of the present invention to provide a process for treating a sulfuric acid-olefinic hydrocarbon mixture.

It is a specific object of this invention to provide a continuous in situ process for the regeneration of a reaction zone effluent comprising a sulfuric acid alkylation catalyst in a more facile and economical manner.

Therefore, the present invention provides a process for treating a sulfuric acid-olefinic hydrocarbon mixture which comprises contacting said mixture with a aromatic compound at contacting conditions wherein said aromatic compound selectively reacts with at least a portion of the olefinic hydrocarbon to form an alkyl aromatic hydrocarbon and a substantially olefinic hydrocarbon-free sulfuric acid is recovered.

As will be described hereinafter in greater detail, the essence of my invention encompasses the treating of a sulfuric acid-olefinic hydrocarbon mixture by contacting this mixture with an aromatic compound at contacting conditions including a temperature below about 72° F. so that the aromatic compound selectively reacts with at least a portion of the olefinic hydrocarbon (which usually comprises primary and polycyclic olefins) to form an alkyl aromatic compound, and a substantially olefinic hydrocarbon-free sulfuric acid is recovered for subsequent reuse.

The description of my invention shall be limited to a processing scheme for handling the effluent from a sulfuric acid alkylation catalyst process reaction zone although the scope of the invention is not necessarily limited thereto. The effluent is prepared by means well known to those skilled in the art and generally comprises the passing of an isoparaffin hydrocarbon feedstock reactant with an olefinic feedstock reactant to a conventional catalytic alkylation reaction zone, wherein a liquid catalyst such as sulfuric acid is intimately contacted by the reactants. At the end of the desired residence time in the catalytic alkylation process reaction zone, the total effluent from the reaction zone is generally removed and passed into separation means including flashing means, fractionation means, and the like in order to obtain the desired products of the catalytic alkylation. My process is concerned with the alkylation reaction zone effluent as soon as the effluent leaves the reaction zone.

My invention can be most clearly described and illustrated with reference to the attached drawing which is a schematic representation of a specific embodiment of this invention.

DESCRIPTION OF THE DRAWING

Referring now to the drawing, an effluent from a catalytic alkylation process reaction zone is passed via line 1 as feed to settler 3. It is preferred that the effluent be charged either before or after flashing means (not shown) to a middle portion of the settler which may contain trays, baffles, heating means, cooling means, and the like. An aromatic compound is admixed with the effluent passing to settler 3 within line 1 so that intimate contacting of the aromatic compound with the olefinic portion of the effluent is achieved. This admixing and contacting step may be achieved in the pipe to settler 3 or, if desired, an admixing-contacting zone may be included in line 1 with mixing means, and the like, to insure complete contacting between the aromatic compound and the olefinic portion of the effluent mixture.

Preferred aromatic compounds for use according to the process of my invention include benzene, toluene, the xylenes, and the various higher molecular weight alkyl aromatic hydrocarbons such as ethylbenzene, ortho-ethyltoluene, meta-ethyltoluene, the propylbenzenes, the hexylbenzenes and mixtures thereof. It is also contemplated within the scope of my invention, that reformates produced by the reforming of a petroleum feed comprising a saturated gasoline fraction which may include straight-run gasoline, natural gasoline, etc. and which is usually referred to as naphtha having an initial boiling point of about 150° to about 250° F. and an end boiling point within the range of about 350° F. to about 425° F. may also be utilized for the aromatic content of the reformate within the scope of my invention. Of the preferred aromatic hydrocarbons, benzene and toluene are especially preferred.

The aromatic compound is admixed and contacted with the reaction zone effluent at temperatures below about 72° F., and preferably at temperatures in the range from about 0° F. to about 70° F. so that the acid portion of the mixture does not absorb the aromatic compound.

In settler 3, a substantially pure sulfuric acid portion of the admixture is separated from a liquid hydrocarbon portion and a gaseous hydrocarbon portion of the admixture. In the drawing, the acid portion that is separated is represented by the numeral 4. The liquid hydrocarbon portion is represented by the numeral 5. The gaseous hydrocarbon portion is represented by the numeral 6. The gaseous portion, usually containing propane and isobutane is then passed to a fractionation zone, and usually to a depropanizer section of the fractionation zone. The liquid hydrocarbon portion passes from settler 3 via line 8 to a fractionation zone and usually to a deisobutanizing portion of the fractionation train. The liquid hydrocarbon portion 5 containing desired alkylate as well as the alkyl aromatic produced by the selective reaction of the olefinic hydrocarbon content of the acid with the aromatic compound is then passed to fractionation for further recovery. The acid portion 4 passes from settler 3 via line 9 for recycle to the alkylation reaction zone to achieve efficiency in the process. The sulfuric acid thus recovered is substantially pure inasmuch as a major portion of the olefinic hydrocarbon has been removed therefrom.

PREFERRED EMBODIMENT

In a particularly preferred embodiment of this invention, this invention provides a continuous in-situ process for the regeneration of a sulfuric acid alkylation catalyst which comprises the steps of: (a) admixing and contacting an aromatic compound with an alkylation reaction zone effluent comprising a sulfuric acid alkylation catalyst-olefinic hydrocarbon mixture, gaseous hydrocarbon, and liquid hydrocarbon; (b) passing the admixture formed in Step (a) into a settling zone wherein said effluent separates into a substantially olefinic hydrocarbon-free sulfuric acid portion, a liquid hydrocarbon portion, and a gaseous hydrocarbon portion; (c) passing the liquid and gaseous hydrocarbon portions to a fractionation zone; and, (d) recovering a substantially olefinic hydrocarbon-free sulfuric acid.

Thus, it is apparent that the present invention provides a process for the treating of a sulfuric acid-olefinic hydrocarbon mixture and the regeneration of a sulfuric acid alkylation catalyst utilizing a minimum of processing steps and a minimum of regeneration apparatus to accomplish the treating or regeneration in a most economical and efficient manner.

I claim as my invention:

1. A continuous in-situ process for the regeneration of a sulfuric acid alkylation catalyst, without first separating said acid from the below specified alkylation effluent, which comprises the steps of:

a. withdrawing from an alkylation reaction zone an alkylation reaction zone effluent comprising a sulfuric acid-olefinic hydrocarbon mixture and liquid hydrocarbon;

b. admixing and contacting an aromatic compound with said acid-containing effluent at a temperature of about 0° F. to about 70° F. whereby said aromatic compound selectively reacts with the olefinic hydrocarbon to form an alkylaromatic hydrocarbon;

c. passing the admixture formed in step (b) into a settling zone wherein said effluent is separated by settling into a substantially olefinic-hydrocarbon-free sulfuric acid portion and a liquid hydrocarbon portion including said alkylaromatic hydrocarbon;

d. passing said liquid hydrocarbon portion of step (c) to a fractionation zone; and, e. recovering from said settling zone a substantially olefinic-hydrocarbon-free sulfuric acid and recycling the latter to said alkylation zone.

2. The process according to claim 1 wherein said aromatic compound is benzene.

3. The process according to claim 1 wherein said aromatic compound is toluene.

4. The process according to claim 1 wherein said aromatic compound is a reformate containing an aromatic hydrocarbon.